United States Patent [19]

Lawson

[11] 4,092,857
[45] June 6, 1978

[54] TENSIOMETER

[75] Inventor: John B. Lawson, Providence, R.I.

[73] Assignee: Lawson-Hemphill, Inc., Central Falls, R.I.

[21] Appl. No.: 812,561

[22] Filed: Jul. 5, 1977

[51] Int. Cl.² .............................................. G01L 5/06
[52] U.S. Cl. .......................................... 73/144; 74/1.5
[58] Field of Search ................. 73/143, 144, 414, 430, 73/496; 74/1.5

[56] References Cited

U.S. PATENT DOCUMENTS

| 1,707,849 | 4/1929 | Fairchild | 74/1.5 X |
| 2,538,932 | 1/1951 | Campbell | 73/144 |
| 3,640,142 | 2/1972 | Stafford et al. | 74/1.5 X |
| 3,713,345 | 1/1973 | Sands | 74/1.5 |
| 3,879,999 | 4/1975 | Saxl | 73/430 X |

Primary Examiner—Charles A. Ruehl

[57] ABSTRACT

A damping mechanism for a rotating-head tensiometer, of the kind with a handle and a measuring head rotatably attached thereto, having an escapement pivoted about its own center of mass, and engaged with a toothed surface, such that, as the measuring head rotates, the escapement oscillates and the desired damping of the measuring head is provided by the inertial resistance of the escapement to oscillation.

1 Claim, 4 Drawing Figures

U.S. Patent    June 6, 1978    4,092,857
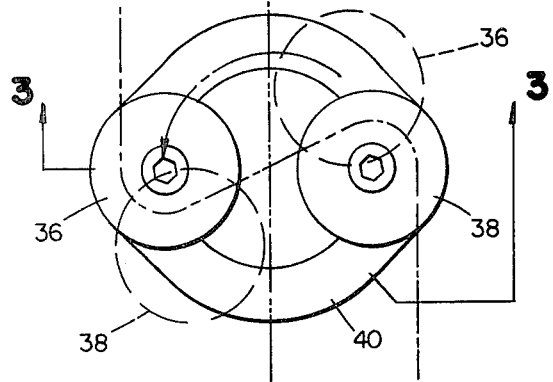
FIG 1
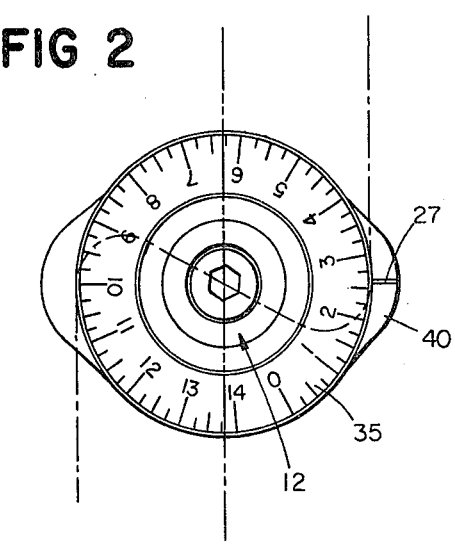
FIG 2
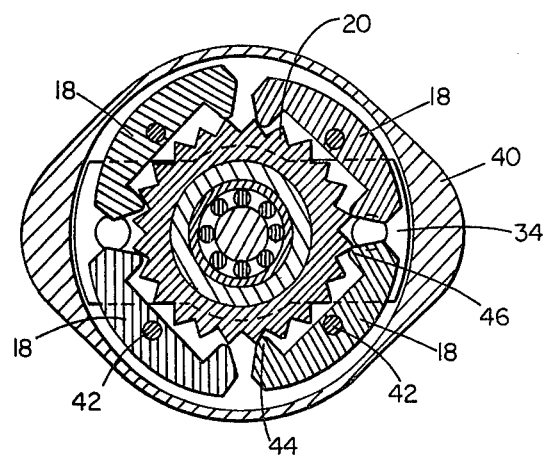
FIG 3
FIG 4

TENSIOMETER

FIELD OF THE INVENTION

The invention relates to damping mechanisms for rotating-head tensiometers.

BACKGROUND OF THE INVENTION

Of the many devices designed to measure yarn tension, one of the simplest, most rugged and potentially easiest to use is the hand-held, rotating-head tensiometer of Campbell U.S. Pat. No. 2,538,932. The Campbell tensiometer, however, has failed to gain widespread acceptance, largely due to the likelihood of yarn breaks and other damage resulting from a snapping action which can occur if the device is inadvertently overturned. While it has long been known that damping the rotating head could slow this snapping action sufficiently to allow for operator correction of it, as well as dampen reading oscillations caused by lateral yarn vibrations, no satisfactory damping mechanism has been designed for the device, and, as a result, it remains generally unaccepted by the trade. Many and various damping concepts have been tried, including fluid and magnetic damping; all have suffered, however, from one or more disadvantages, including insubstantial damping, high cost, delicacy, and short operating life.

SUMMARY OF THE INVENTION

I have discovered that by providing means to oscillate an escapement in proportion to the speed with which the measuring head of the tensiometer rotates, the rotational inertia of the oscillating escapement will provide the required damping, a design results which does not sacrifice the simplicity, ruggedness and low cost inherent to the Campbell tensiometer.

In preferred embodiments, the escapement is pivoted freely on an interior face of the tensiometer handle and has integral with it two spaced follower tits which alternately engage a toothed wheel fixed to the rotating measuring head. As the measuring head rotates, the toothed wheel causes the escapement to oscillate. Thus, rapid rotation of the measuring head is damped by the inertial resistance to oscillation of the escapement, while slow rotation is unresisted. Further, by pivoting the escapement about its center of mass, the escapement has no static effect on the tensiometer reading during rotation of the tensiometer.

PREFERRED EMBODIMENT

I turn now to description of a presently preferred embodiment of the invention.

DRAWINGS

FIG. 1 is an elevation view of the measuring head end of said embodiment showing the yarn around two rollers in position for measuring tension.

FIG. 2 is an elevation view of the handle end of said embodiment showing the tension scale.

FIG. 3 is a cross-sectional view taken through FIG. 1 at 3—3.

FIG. 4 is a cross-sectional view taken through FIG. 3 at 4—4 showing the escapement damping mechanism of said embodiment.

DESCRIPTION

The embodiment shown in the drawings and its operation are now described.

1. Embodiment

There is shown in FIG. 3 a cross-sectional view of a tensiometer. It has as major elements a handle 12; rotatably attached to the handle, a measuring head 14; and, connected between the handle and the measuring head, a torsion spring 16.

Handle 12 has two hollow sections, a cylindrically-shaped lower handle 22 and a generally conically-shaped handle body 24. Joining the two sections at face 25 is spindle 26, which is attached to the lower handle by screw 28 through plug 30, and to handle body by its wide-diameter base 32. Scale 35 is fixed around the conical surface of handle body 24.

Measuring head 14 rotates on the other end of spindle 26. It consists of a beam 34, on which two yarn rollers 36 and 38 are rotatably fastened with suitable bearings, spacers and screws. Between the yarn rollers and the beam is cup-shaped cover 40 which has two indentations 41, matching the roller diameters, which keep out dust and lint.

Torsion spring 16 makes the torsion connection between handle 12 and measuring head 14. Slipped over spindle 26, the spring is secured on each end by tabs which are received by suitable holes in spindle base 32 and beam 34. Two cooperating pins limit the relative rotation between handle 12 and measuring head 14 to just under 360°. Pin 48 protrudes from beam 34. A second pin (not shown) depends from the interior of handle body 24.

An escapement mechanism, located in the cavity between handle body 24 and beam 34, damps the relative rotation between handle 12 and measuring head 14 (best shown in FIG. 4). Toothed wheel 20 is pressed onto beam 34 and rotates with the measuring head. Escapements 18 are freely pivoted about their centers of mass on pins 42 protruding from handle body 24. This mass balancing avoids any static influence the escapement might have during rotation of the tensiometer. Two follower tits 44 and 46, located at opposite ends of each escapement, alternately engage the rotating toothed wheel, causing the escapements to oscillate at a frequency proportional to the rotation speed of the measuring head. Each tit is shaped so that it smoothly follows the contour of the teeth on the toothed wheel. And, the spacing between tits is selected to put the second tit 180° out of phase with the first tit; as the first tit reaches the recess of one tooth, the second tit reaches the tip of another tooth. A smooth, rocking motion of the escapement results. With more than one escapement, the smoothest operation is obtained by staggering the oscillation phase of each; here, with four escapements, a 90° phase separation is best. Weight and elongation of the escapements have been maximized since damping is proportional to their rotational inertia.

2. Operation

Before making a tension measurement, the tensiometer is readjusted to zero by loosening screw 28 momentarily and rotating the handle body 24 until scale 35 reads zero with reference to index line 27.

With the tensiometer held by handle 12 in one hand, yarn tension is measured by positioning measuring head 14 as shown in phantom in FIG. 1, with the yarn passing between the rollers undisturbed, and then rotating handle 12 until enough torque is passed through the torsion spring to rotate measuring head 14 to the position shown in FIG. 1, where the plane defined by the axes of the two rollers is at right angles with the yarn. A tension reading of 2.6 gm. is shown. During a measurement, depending on yarn tension, rotation of the handle relative to the measuring head may reach nearly 360°, stopped only by pin 48 on the head meeting the stop pin (not shown) on the handle. Rotation of the measuring head, however, is the same whatever the yarn tension, being about 90°. Small variations in either direction from the right-angle orientation will only slightly reduce the tension reading by the Cosine of the angular deviation.

Larger over-turning deviations, however, have been the principal source of difficulty with the Campbell tensiometer. With yarn tensions which produce large measuring head rotation relative to the handle, over-turning the head sufficiently past the above-described right-angle position produces an unstable condition where the head will accelerate under the spring torque until reaching an equilibrium position, often resulting in yarn breaks and tensiometer damage. With the present invention, however, measuring head rotations are slowed sufficiently to allow the operator either to turn the handle or release the yarn in time to recover from the over-turning. A further advantage to incorporating a damper within the tensiometer is the damping of undesirable measuring head oscillations, which occur under conditions of high lateral yarn vibration, such as are present on a high-speed traverse in a winder.

Other embodiments are within the scope of the description and claims.

What is claimed is:

1. A rotating head tensiometer adapted for measurement of the tension on a running yarn, which comprises:
   a handle,
   a measuring head rotatably mounted on said handle and provided with walls surrounding an enclosure facing said handle;
   a beam carried in said enclosure for rotation with said measuring head relative to said handle,
   a pair of rollers rotatably mounted on said beam above said walls for rotation of said beam an amount proportional to yarn tension,
   a toothed wheel carried by said beam therearound for rotation therewith, and
   a plurality of escapements mounted therearound for oscillation about axes parallel to the axis of relative rotation of said handle and said measuring head,
   each of the escapement axes being coincident with the center of inertia of the respective escapement,
   each of said escapements being heavy, elongated, and having a pair of protuberances engaging the toothed surface of said toothed wheel, whereby moment of inertia is high even at low rates of head rotation and no weight bias of the heavy escapements tend to change the tension reading at whatever angle said tensiometer is held.

* * * * *